US008273471B2

(12) United States Patent
Hain et al.

(10) Patent No.: US 8,273,471 B2
(45) Date of Patent: Sep. 25, 2012

(54) INTERCHANGEABLE BATTERY PACK APPARATUS AND METHOD

(75) Inventors: Larry Hain, Chalfont, PA (US); Giancarlo Punis, Chalfont, PA (US)

(73) Assignee: Honeywell International Inc., Morristown, NJ (US)

( * ) Notice: Subject to any disclaimer, the term of this patent is extended or adjusted under 35 U.S.C. 154(b) by 81 days.

(21) Appl. No.: 12/861,239

(22) Filed: Aug. 23, 2010

(65) Prior Publication Data
US 2012/0045675 A1 Feb. 23, 2012

(51) Int. Cl.
H01M 2/04 (2006.01)
H01M 2/06 (2006.01)
H01M 2/08 (2006.01)

(52) U.S. Cl. ............ 429/7; 29/623.1; 29/623.5; 429/99; 429/100; 429/177; 429/179

(58) Field of Classification Search .............. 429/7, 99, 429/100, 159, 177, 179; 29/623.1, 623.5
See application file for complete search history.

(56) References Cited

U.S. PATENT DOCUMENTS

| 1,611,519 | A | * | 12/1926 | Franklin | 429/100 |
|---|---|---|---|---|---|
| 4,861,685 | A | * | 8/1989 | Tien et al. | 429/7 |
| 5,476,731 | A | | 12/1995 | Karsten et al. | |
| 5,795,664 | A | * | 8/1998 | Kelly | 429/7 |
| 5,909,104 | A | | 6/1999 | Scott | |
| 5,962,159 | A | * | 10/1999 | Satou et al. | 429/99 |
| 5,998,967 | A | | 12/1999 | Umeki et al. | |
| 6,046,575 | A | | 4/2000 | Demuro | |
| 6,368,743 | B1 | * | 4/2002 | Guerin et al. | 429/159 |
| 6,428,925 | B1 | * | 8/2002 | Takeno et al. | 429/163 |
| 6,733,919 | B1 | * | 5/2004 | Nguyen et al. | 429/99 |
| 7,867,643 | B2 | * | 1/2011 | Cho | 429/61 |
| 2004/0251872 | A1 | * | 12/2004 | Wang et al. | 320/112 |
| 2006/0024575 | A1 | | 2/2006 | Robinson et al. | |
| 2006/0257731 | A1 | * | 11/2006 | Yoon | 429/176 |
| 2006/0263648 | A1 | * | 11/2006 | Park et al. | 429/7 |
| 2006/0267545 | A1 | | 11/2006 | Lee et al. | |
| 2007/0273332 | A1 | | 11/2007 | Funabashi et al. | |
| 2008/0113262 | A1 | * | 5/2008 | Phillips et al. | 429/149 |
| 2008/0169788 | A1 | | 7/2008 | Bobbin et al. | |
| 2008/0226971 | A1 | * | 9/2008 | Stickel | 429/99 |
| 2008/0284372 | A1 | * | 11/2008 | Cover et al. | 320/112 |
| 2010/0055556 | A1 | * | 3/2010 | Meschter | 429/159 |

FOREIGN PATENT DOCUMENTS

GB 2 005 037 A 4/1979

OTHER PUBLICATIONS

EP Search Report for 11177035.0 dated Dec. 5, 2011.

* cited by examiner

Primary Examiner — Robert B Davis
(74) Attorney, Agent, or Firm — Kermit D. Lopez; Luis M. Ortiz; Kevin Soules

(57) ABSTRACT

An interchangeable battery pack apparatus and method are disclosed which includes a top housing having a printed circuit board and a connector for electrically connecting a pair of batteries in order to provide an electrical power with respect to an external device. A bottom housing having a number of battery components for connecting the batteries can be coupled to the top housing via a fastener to form a battery pack in order to secure the batteries from a humid and corrosive environment. The battery pack can be interchangeably utilized as a replaceable battery pack and/or a ruggedized potted battery pack.

20 Claims, 6 Drawing Sheets

INTERCHANGEABLE BATTERY PACK APPARATUS AND METHOD

TECHNICAL FIELD

Embodiments are generally related to battery packing methods and systems. Embodiments are also related to intrinsically safe lithium battery packs. Embodiments are additionally related to interchangeable packaging methods for providing an intrinsically safe battery pack.

BACKGROUND OF THE INVENTION

A battery pack generally includes a set of (preferably) identical batteries or individual battery cells. The battery pack can be typically attached to an external application device (e.g., a transmitter) in a detachable manner to supply an electric power to the device or it can be attached to a battery charger to be charged. The batteries located on the battery pack are generally arranged on an underlying support, held down on the support by means of a cover that overlies the batteries, and secured to the underlying support. The terminals of the batteries can be electrically connected to each other (e.g., in series, parallel, or a mixture of both) by means of a number of inter-battery connectors and springs for holding the batteries in the battery pack and to deliver a desired voltage, capacity, and power density.

An intrinsically safe battery pack can be defined as a cell pack whose energy is limited to a point so as not to cause ignition as properly utilized in various atmospheres. Most prior art battery pack designs are not intrinsically safe in a hazardous environment. Such prior art battery pack designs are unable to provide a ruggedized protection with respect to the batteries in a humid and corrosive environment. Additionally, such battery packs do not provide a secured means for replacing the batteries attached to the application device in the hazardous environment.

Based on the foregoing, it is believed that a need exists for an improved interchangeable battery pack apparatus and method. A need also exists for an interchangeable packaging method for providing an intrinsically safe battery pack, as described in greater detail herein.

BRIEF SUMMARY

The following summary is provided to facilitate an understanding of some of the innovative features unique to the disclosed embodiment and is not intended to be a full description. A full appreciation of the various aspects of the embodiments disclosed herein can be gained by taking the entire specification, claims, drawings, and abstract as a whole.

It is, therefore, one aspect of the disclosed embodiments to provide for an improved interchangeable battery pack apparatus and method.

It is another aspect of the disclosed embodiments to provide for an improved interchangeable packaging method for providing an intrinsically safe battery pack.

The aforementioned aspects and other objectives and advantages can now be achieved as described herein. An interchangeable battery pack apparatus and method is disclosed herein. A top housing having a printed circuit board and a connector for electrically connecting a pair of batteries in order to provide an electrical power with respect to an external device via a pair of terminal plates located on the top housing. A bottom housing having a number of battery components for connecting the batteries can be coupled to the top housing via a fastener to form a battery pack in order to secure the batteries from a humid and corrosive environment. The battery pack can be interchangeably utilized as a replaceable battery pack and/or a ruggedized potted battery pack.

The replaceable battery pack includes a spring for connecting the printed circuit board and the connector to the batteries and a battery connector for connecting the battery components to the batteries. The PCB and the connector receive and provide an operating power from the batteries to an external device (e.g. transmitter) via the spring. The spring and the battery contact operatively hold the batteries and an expired battery can be replaced with an off-shelf battery. The ruggedized potted battery pack includes: a wire lead for connecting the printed circuit board and the battery components to the batteries, and a pair of potting holes located on the top housing for pouring a potting compound. The wire lead directly connects the batteries with the PCB and battery components by eliminating the spring and the battery contact. Such an interchangeable battery packaging approach provides an intrinsically safe battery pack and secures the batteries from a humid and corrosive environment.

BRIEF DESCRIPTION OF THE DRAWINGS

The accompanying figures, in which like reference numerals refer to identical or functionally-similar elements throughout the separate views and which are incorporated in and form a part of the specification, further illustrate the present invention and, together with the detailed description of the invention, serve to explain the principles of the present invention.

DETAILED DESCRIPTION

The particular values and configurations discussed in these non-limiting examples can be varied and are cited merely to illustrate at least one embodiment and are not intended to limit the scope thereof.

Figure 1:
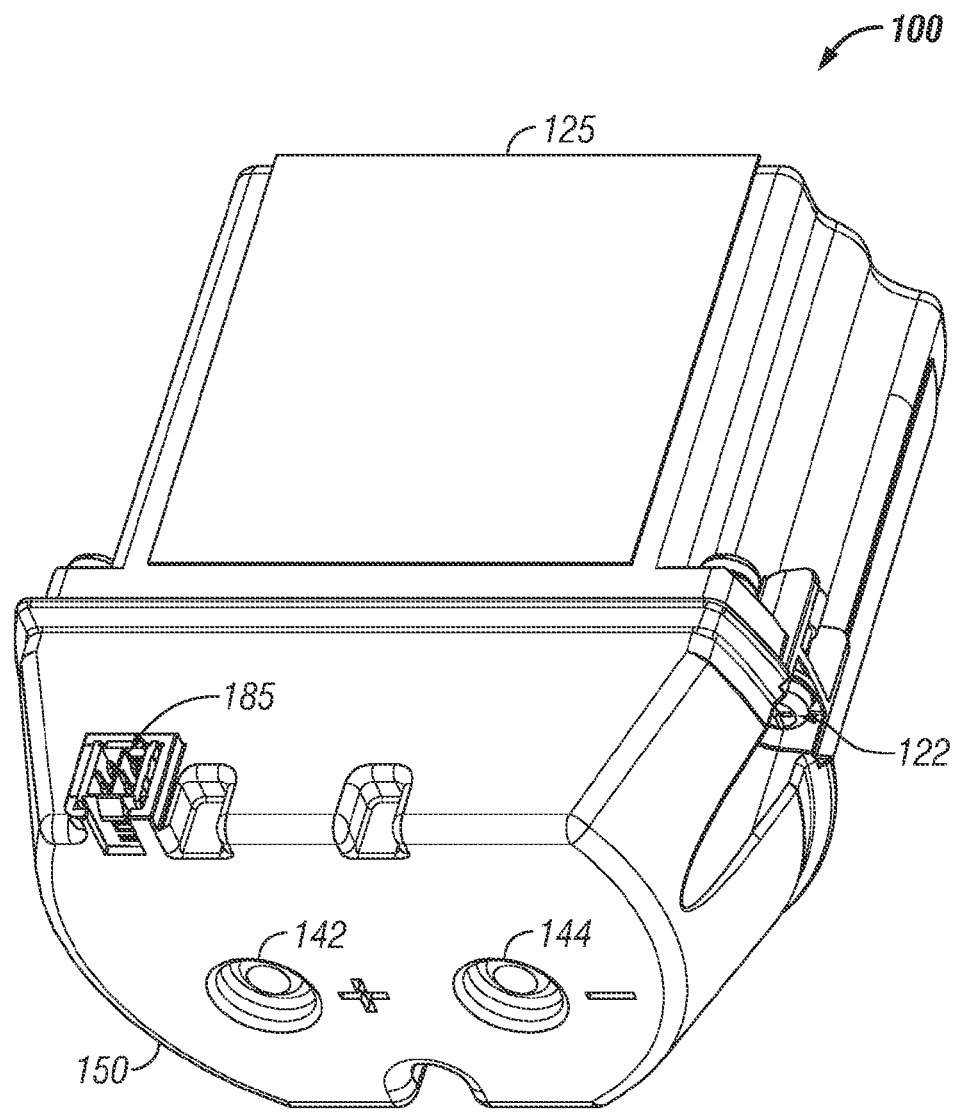
FIG. 1 illustrates a perspective view of an intrinsically safe battery pack, accordance with the disclosed embodiments.

FIG. 1 illustrates a perspective view of an intrinsically safe battery pack 100, in accordance with the disclosed embodiments. The intrinsically safe battery pack 100 can be typically employed to secure one or more batteries 105 and 110 within a hazardous environment while providing an operating power to an external application device (not shown). Note that the battery pack 100 can accommodate the batteries such as, for example, a D-size lithium battery. It can be appreciated, of course, that other types of batteries may be utilized to implement the battery pack 100. The battery pack 100 generally includes a bottom housing 125 and a top housing 150 that can be connected utilizing a fastener 124. The fastener 124 may include fasteners such as, for example a screw, a rivet, a bolt and the like. Note that the screws 122 can secure the battery pack 100 to a transmitter or other device.

Figure 2:
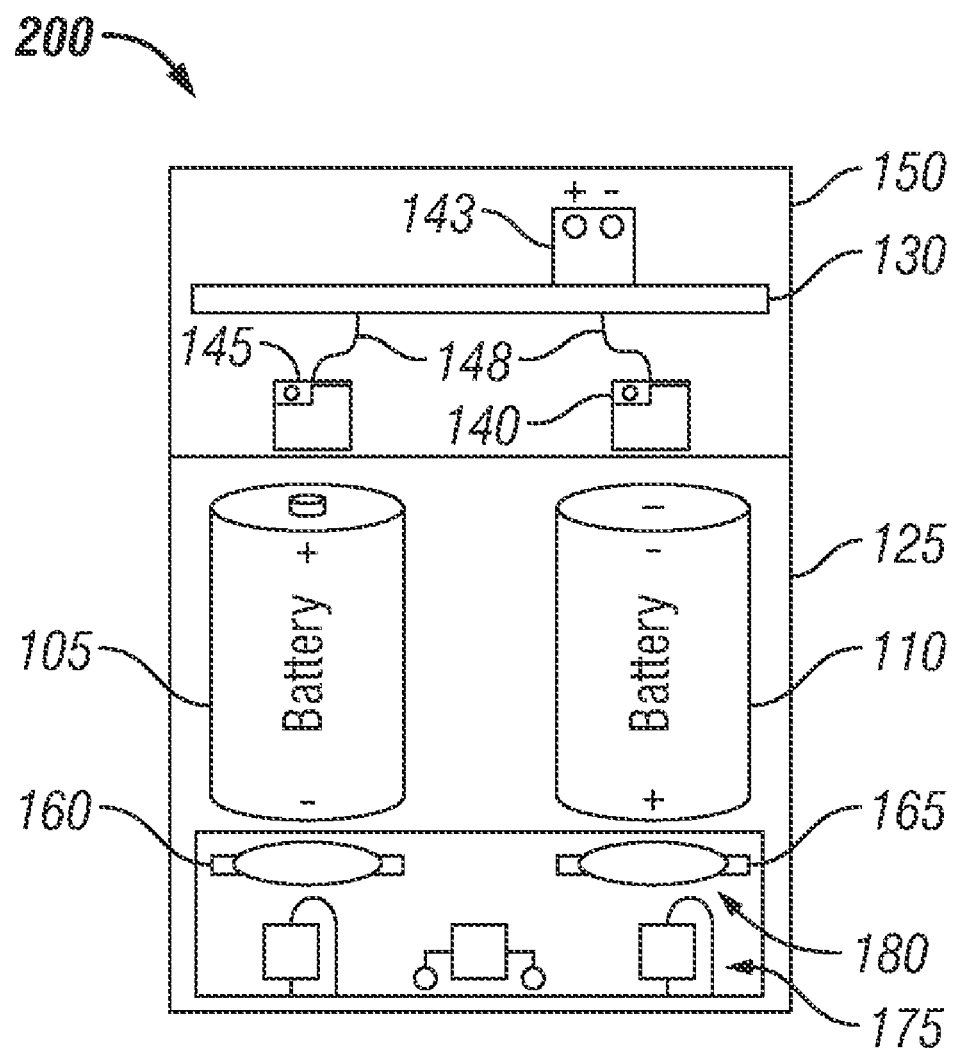
FIG. 2 illustrates a schematic diagram of a replaceable intrinsically safe battery pack, in accordance with the disclosed embodiments.

The bottom housing 125 and the top housing 150 can be fixed together to form an enclosure around the batteries 105 and 110. The batteries 105 and 110 can be electrically connected to one another via a connector 185 and to a pair of terminal plates 142 and 144. Each of the terminal plates 142 and 144 is either anodic (−) or cathodic (+) terminal plates based upon their respective connections to the batteries 105 and 110. The battery pack 100 houses the batteries 105 and 110 as well as battery circuitry 180 for controlling the intrinsic safety of the battery functions. The battery circuitry 180, as shown in FIG. 2, including associated electrical components, can be typically implemented on a circuit carrying substrate such as a printed circuit board (PCB) or flexible film substrate. The battery pack 100 can be housed in a case formed from a rigid material such as, for example, plastic, depending upon design considerations. The housing 125 and 150 seals and protects the batteries 105 and 110, the internal battery circuitry 130, 180, and associated electrical components. Note that the terminal plates 142 and 144 generally provide a means to check the charge status of the batteries without requiring the use of connector 185 or disassembling the battery pack.

The charge status of the battery pack 100 can be determined via the terminal plates 142 and 144 and connector 185. The battery pack 100 can be connected to a wide variety of portable external devices such as, for example, a transmitter, a receiver, a sensor, and the like. Such an intrinsically safe battery pack 100 can be utilized as a basis, for example, of the replaceable intrinsically safe battery pack 200 shown in FIG. 2 and/or the ruggedized intrinsically safe battery pack 300 shown herein with respect to FIG. 3.

Figure 3:
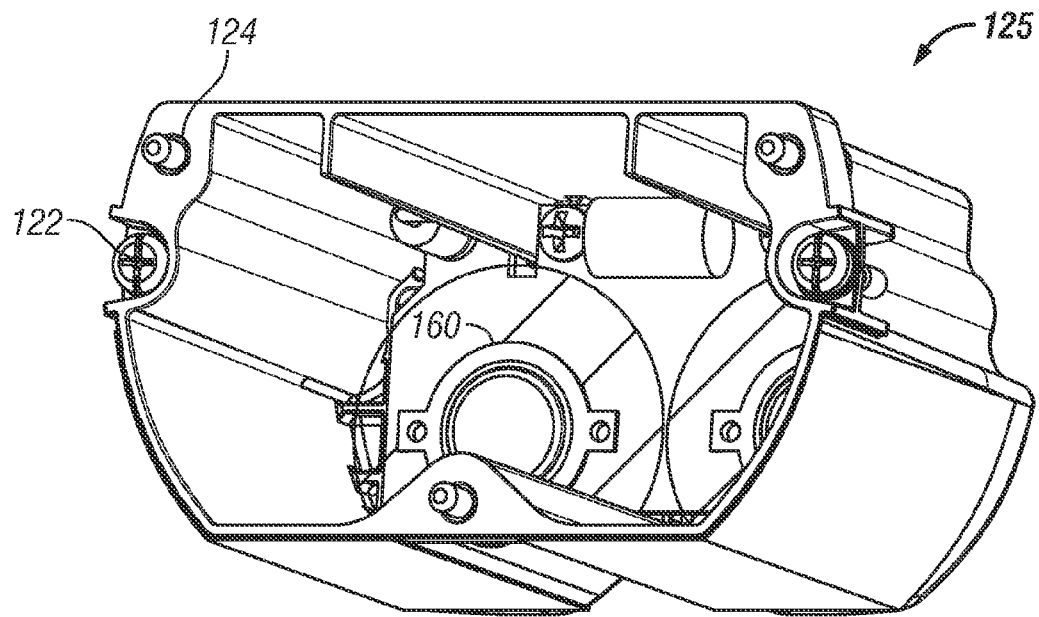
FIG. 3 illustrates a perspective view of a bottom housing of the replaceable intrinsically safe battery pack, in accordance with the disclosed embodiments.

FIG. 2 illustrates a schematic diagram of a replaceable intrinsically safe battery pack 200, in accordance with the disclosed embodiments. Note that in FIGS. 1-8 identical parts or elements are generally indicated by identical reference numerals. The bottom housing 125 having one or more intrinsically safe battery components 175 can be connected in association with the batteries 105 and 110 via a pair of battery contacts 160 and 165. FIG. 3 illustrates a perspective view of the bottom housing 125, in accordance with the disclosed embodiments. The intrinsically safe components 175 provide a safe and secure operation with respect to the batteries 105 and 110. The intrinsically safe components 175 generally include a fuse, a voltage limit, and the like. The bottom housing 125 further includes one or more fasteners 124 that can be positioned with respect to one or more threaded holes 126 located on the top housing 150, as shown in FIG. 4.

Figure 4:
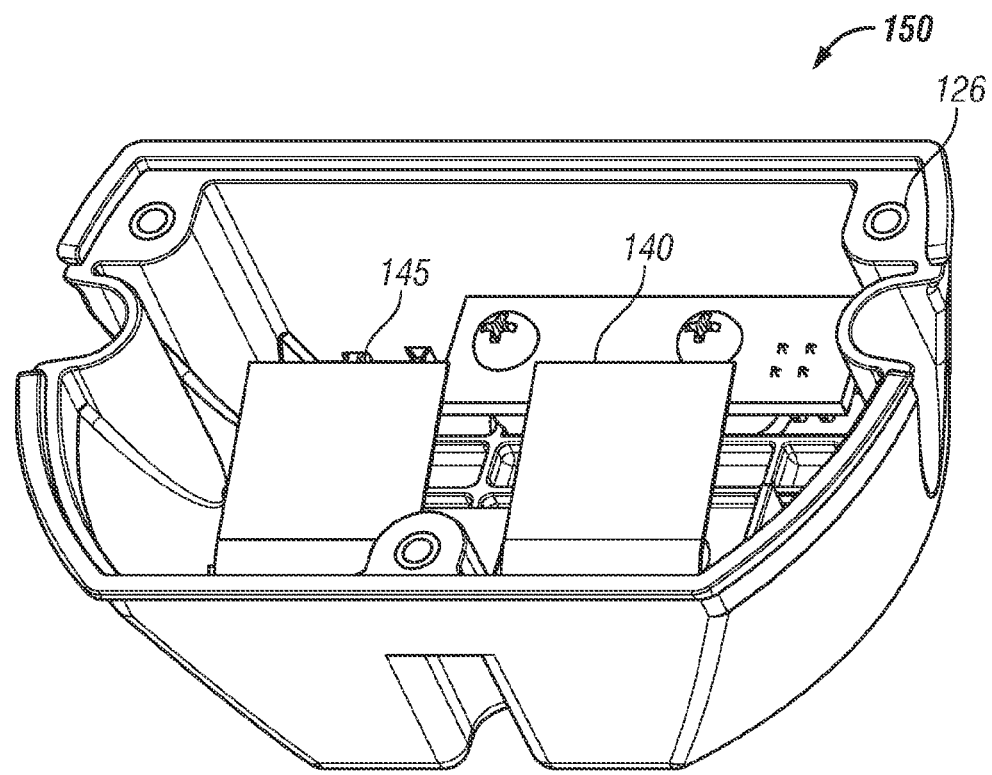
FIG. 4 illustrates a perspective view of a top housing of the replaceable intrinsically safe battery pack, in accordance with the disclosed embodiments.

FIG. 4 illustrates a perspective view of the top housing 150, in accordance with the disclosed embodiments. The top housing 150 having the printed circuit board (PCB) 130 and a connector 143 can be electrically coupled to the batteries 105 and 110 via a pair of springs 140 and 145 and a wire lead 148, as shown in FIG. 2. The batteries 105 and 110 can be held in a spaced relation with the PCB 130 in order to provide sufficient space between the PCB 130 and the batteries 105 and 110 for mounting the springs 140 and 145. The springs 140 and 145 and the battery contacts 160 and 165 located on the top housing 150 and the bottom housing 125 holds the batteries 105 and 110 in association with the battery pack 200.

The PCB 130 and the connector 143 provide operating power from the batteries 105 and 110 to the external application device via the springs 140 and 145. The PCB 130 mechanically supports and electrically connects electronic components using conductive pathways, tracks, or signal traces etched from copper sheets laminated onto a non-conductive substrate. The connector 143 connects the battery pack 200 to the external device. Such replaceable intrinsically safe battery pack 200 permits to replace an expired battery mounted on the battery pack 200 with an approved off-shelf battery.

Figure 5:
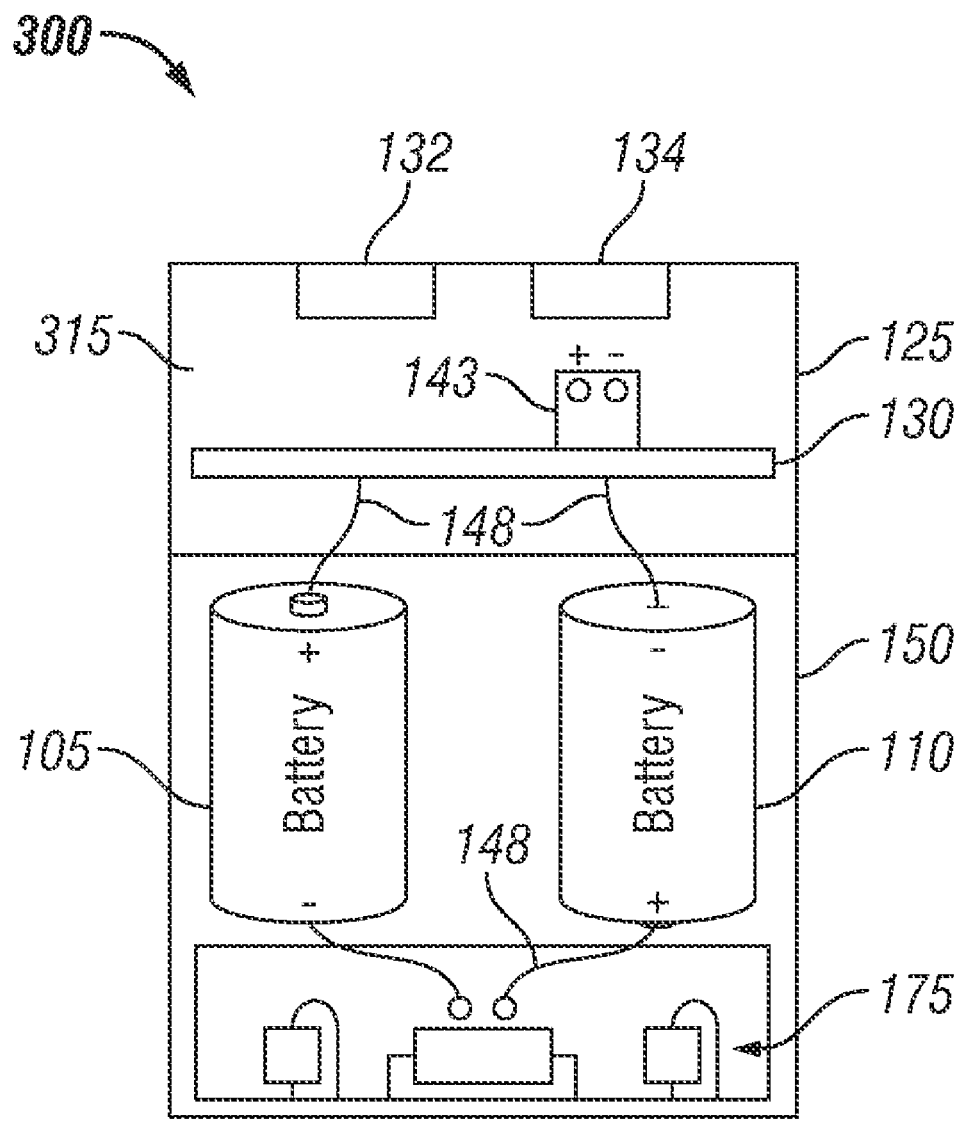
FIG. 5 illustrates a schematic diagram of a ruggedized potted intrinsically safe battery pack, in accordance with the disclosed embodiments.

FIG. 5 illustrates a schematic diagram of the ruggedized potted intrinsically safe battery pack 300, in accordance with the disclosed embodiments. Again as a reminder in FIGS. 1-8, identical parts or elements are generally indicated by identical reference numerals. The ruggedized potted battery pack 300 comprises the bottom housing 125 and the top housing 150 for accommodating the batteries 105 and 110 with respect to the external application device. The ruggedized potted battery pack 300 can be formed by filling the battery pack 300 with a potting compound 315 via a pair of potting holes 132 and 134 in order to protect the batteries 105 and 110 from a humid and corrosive environment.

The potting compound 315 can be disposed in the battery pack 300, which completely encapsulates all the surfaces of the associated components and provides a uniform thickness of the potting compound 315 with respect to the components. The potting compound 315 may be configured to dissipate heat generated by an internal short of one of the components and/or heat generated by over-charging or over-discharging one of the plurality of components such that the temperature of any external surface of the battery pack assembly 300 does not exceed a predetermined temperature and prevents a venting of one of the components within the potting compound 315.

Note that the components associated with the intrinsically safe battery pack 200 can be molded utilizing an injection molding technique. In general, the battery pack components can be constructed by feeding a material into a heated barrel (e.g. a battery pack) mixed, and forced into a mold cavity where it cools and hardens to the configuration of the mold cavity. Such a technique facilitates the intrinsically safe battery pack 200 to be converted as the ruggedized potted intrinsically safe battery pack 300 for securing the batteries 105 and 110 from a humid and corrosive environment. The wire lead 148 directly connects the batteries 105 and 110 with the PCB 130 and battery components 175 by eliminating the springs 140 and 145 and the battery contacts 160 and 165.

Figure 6:
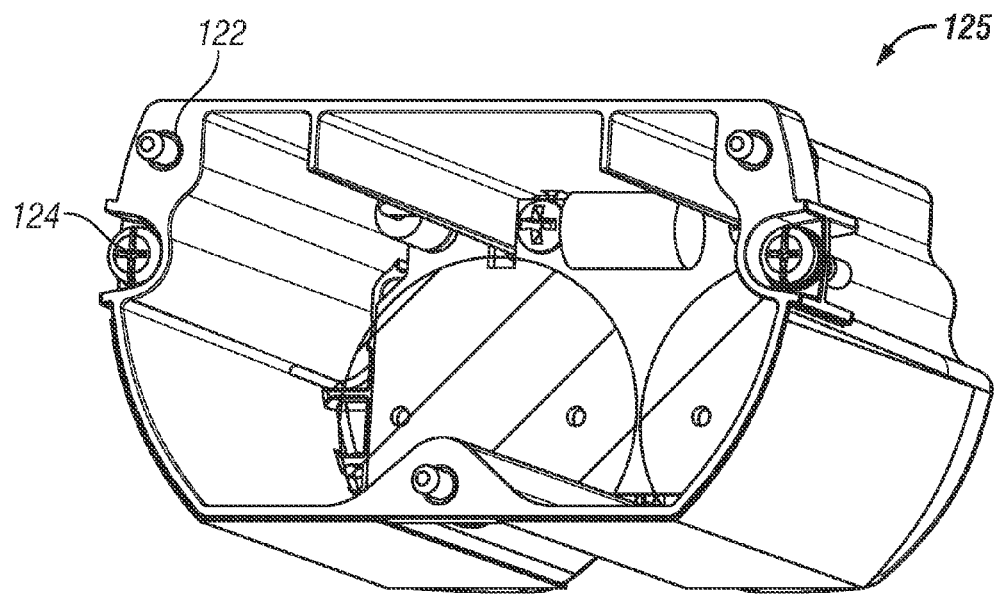
FIG. 6 illustrates a perspective view of a bottom housing of the ruggedized potted intrinsically safe battery pack, in accordance with the disclosed embodiments.
Figure 7:
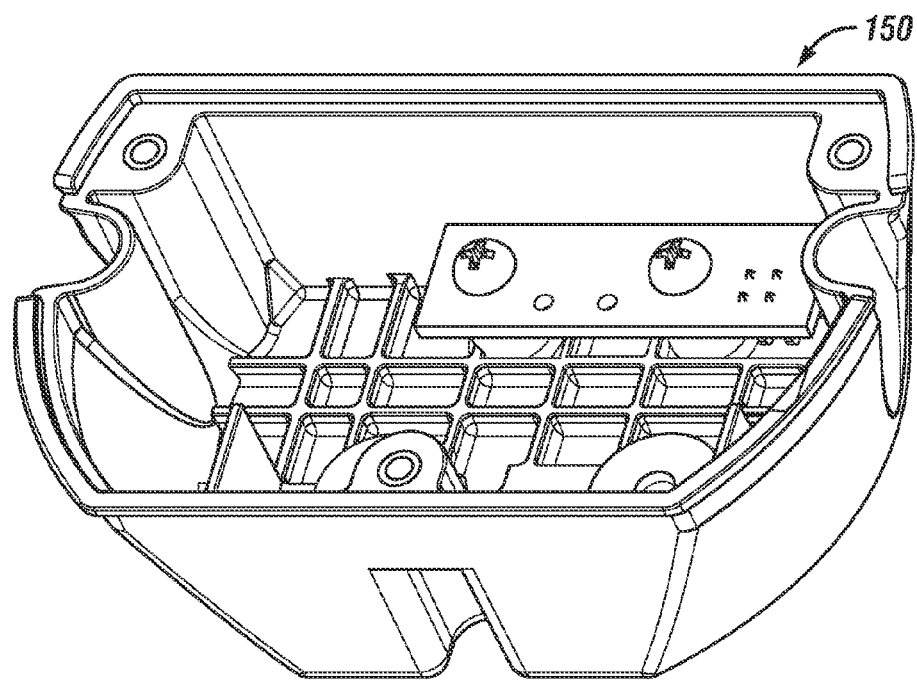
FIG. 7 illustrates a perspective view of a top housing of the ruggedized potted intrinsically safe battery pack, in accordance with the disclosed embodiments.

FIG. 6 illustrates a perspective view of the bottom housing 125 of the ruggedized potted battery pack 300, in accordance with the disclosed embodiments. The bottom housing 125 includes the intrinsically safe components 175 connected directly to the battery terminals via the wire leads 148 for securing the batteries 105 and 110 in the battery pack 300. FIG. 7 illustrates a perspective view of the top housing 150 of the ruggedized potted battery pack 300, in accordance with the disclosed embodiments. The top housing 150 includes the potting holes 132 and 134 for pouring the potting compound 315 into the battery pack 300. The top housing 150 also includes the printed circuit board 130 having the connector 143 electrically coupled to the batteries 105 and 110.

Figure 8:
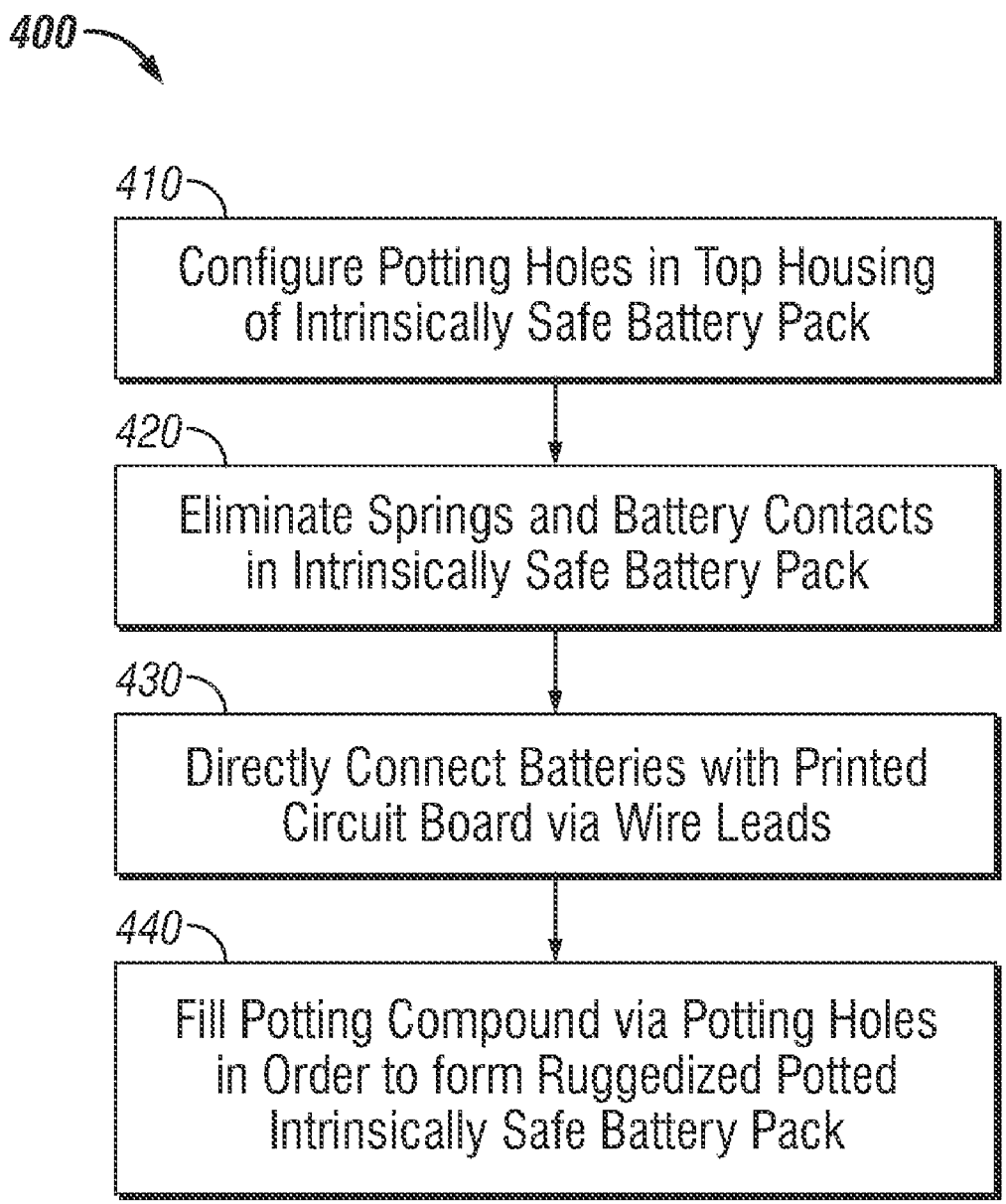
FIG. 8 illustrates a high level flow chart of operation illustrating logical operational steps of a method for converting the replaceable battery pack into the ruggedized potted battery pack, in accordance with the disclosed embodiments.

FIG. 8 illustrates a high level flow chart of operation illustrating logical operational steps of a method 300 for forming the replaceable intrinsically safe battery pack 200 from the intrinsically safe battery pack 100, in accordance with the disclosed embodiments. The packaging method 400 herein utilizes same package to manufacture two different types of battery packs (e.g. the replaceable battery pack 200 and the ruggedized potted battery pack 300). The potting holes 132 and 134 can be configured in the top housing 150 of the intrinsically safe battery pack 100, as illustrated at block 410. The springs 140 and 145 and the battery contacts 160 and 165 in the intrinsically safe battery pack 100 can be eliminated, as depicted at block 420. The batteries 105 and 110 can be directly connected with the printed circuit board 130 via the wire leads 148, as indicated at block 430. The potting compound 315 can be filled via the potting holes 132 and 134 in order to form ruggedized potted battery pack 300, as illustrated at block 440. Such interchangeable battery packaging approach provides a battery pack that can be efficiently employed as both replaceable battery pack 200 and ruggedized potted battery pack 300.

It will be appreciated that variations of the above-disclosed and other features and functions, or alternatives thereof, may be desirably combined into many other different systems or applications. Also, that various presently unforeseen or unanticipated alternatives, modifications, variations, or improvements therein may be subsequently made by those skilled in the art which are also intended to be encompassed by the following claims.

What is claimed is:

1. A battery pack apparatus, comprising:
a top housing having a printed circuit board and a connector for electrically connecting at least two batteries to at least one anodic terminal plate and at least one cathodic terminal plate, to provide electrical power with respect to an external device via a connector located on said top housing, and wherein said at least one anodic and cathodic terminal plates are configured to provide a charge status of said batteries; and
a bottom housing having a plurality of battery components for electrically connecting said at least two batteries wherein said bottom housing is operatively coupled to said top housing via a fastener to form a battery pack in order to secure said at least two batteries from a humid and corrosive environment.

2. The apparatus of claim 1 wherein said battery pack is further configured to allow replacement of said at least two batteries within said battery pack.

3. The apparatus of claim 1 wherein said battery pack comprises a potted battery pack.

4. The apparatus of claim 2 wherein said replaceable battery pack further comprises:
a spring for connecting said printed circuit board and said connector to said at least two batteries; and
a battery contact for electrically connecting said plurality of battery components with said at least two batteries in order to replace an expired battery with an off-shelf battery.

5. The apparatus of claim 3 wherein said potted battery pack further comprises:
a wire lead for electrically coupling said printed circuit board and said plurality of battery components with respect to said at least two batteries; and
a pair of potting holes located on said top housing for pouring a potting compound into said battery pack in order to secure said at least two batteries.

6. The apparatus of claim 1 wherein said at least two batteries comprises a lithium battery.

7. A battery pack apparatus, comprising:
a top housing having a connector for electrically connecting at least two batteries to at least one anodic terminal plate and at least one cathodic terminal plate, to provide electrical power with respect to an external device via a connector located on said top housing, and wherein said at least one anodic and cathodic terminal plates are configured to provide a charge status of said batteries; and
a bottom housing having a plurality of battery components for electrically connecting said at least two batteries wherein said bottom housing is operatively coupled to said top housing via a fastener to form a battery pack in order to secure said at least two batteries from a humid and corrosive environment.

8. The apparatus of claim 7 wherein said top housing further comprises a printed circuit board that communicates electrically with said connector.

9. The apparatus of claim 7 wherein said at least two batteries comprises a lithium battery.

10. The apparatus of claim 7 wherein said battery pack battery pack is further configured to allow replacement of said at least two batteries within said battery pack.

11. The apparatus of claim 7 wherein said battery pack comprises a potted battery pack.

12. A method, comprising:
electrically connecting a printed circuit board and a connector located on a top housing with at least two batteries to at least one anodic terminal plate and at least one cathodic terminal plate, in order to provide an electrical power with respect to an external device via a connector mounted on said top housing, and wherein said at least one anodic and cathodic terminal plates are configured to provide a charge status of said batteries; and
coupling a plurality of battery components located on a bottom housing with said at least two batteries in order to thereafter connect said bottom housing to said top housing in order to form a battery pack to secure said at least two batteries from a humid and corrosive environment.

13. The method of claim 12 further comprising configuring said battery pack to allow replacement of said at least two batteries within said battery pack.

14. The method of claim 12 further comprising configuring battery pack to comprise a potted battery pack.

15. The method of claim 14 further comprising:
connecting said printed circuit board and said connector to said at least two batteries via a spring; and
connecting said plurality of battery components with said at least two batteries via a battery contact in order to replace an expired battery with an off-shelf battery.

16. The method of claim 15 further comprising:
electrically coupling said printed circuit board and said plurality of battery components with respect to said at least two batteries via a wire lead; and
pouring a potting compound into said battery pack via a pair of potting holes located on said top housing in order secure said at least two batteries.

17. The method of claim 12 further comprising configuring said at least two batteries to comprise a lithium battery.

18. The method of claim 12 further comprising providing a positive terminal plate and a negative terminal plate that allow for a determination of a charge status of said at least two batteries without requiring a use of said connector and/or disassembling said battery pack.

19. The method of claim 14 further comprising:
connecting said printed circuit board and said connector to said at least two batteries via a spring;
connecting said plurality of battery components with said at least two batteries via a battery contact in order to replace an expired battery with an off-shelf battery;

electrically coupling said printed circuit board and said plurality of battery components with respect to said at, least two batteries via a wire lead; and pouring a potting compound into said battery pack via a pair of potting holes located on said top housing in order to secure said at least two batteries.

20. The method of claim 19 further comprising configuring said at least two batteries to comprise a lithium battery.

* * * * *